(12) United States Patent
Yamashita et al.

(10) Patent No.: US 9,866,898 B2
(45) Date of Patent: Jan. 9, 2018

(54) ELEMENTARY STREAM MULTIPLEXING METHOD, MULTIPLEXING SYSTEM, ENCODING OR DECODING METHOD AND APPARATUS

(71) Applicant: FUJITSU LIMITED, Kawasaki-shi, Kanagawa (JP)

(72) Inventors: Kazuhiro Yamashita, Fukuoka (JP); Yousuke Yamaguchi, Fukuoka (JP); Takafumi Kamito, Fukuoka (JP); Yasuo Misuda, Inagi (JP); Yoshihiro Tomita, Koga (JP); Yosuke Takabayashi, Sagamihara (JP)

(73) Assignee: FUJITSU LIMITED, Kawasaki (JP)

( * ) Notice: Subject to any disclaimer, the term of this patent is extended or adjusted under 35 U.S.C. 154(b) by 564 days.

(21) Appl. No.: 14/468,413

(22) Filed: Aug. 26, 2014

(65) Prior Publication Data

US 2014/0369425 A1    Dec. 18, 2014

Related U.S. Application Data

(63) Continuation of application No. PCT/JP2012/058427, filed on Mar. 29, 2012.

(51) Int. Cl.
*H04N 7/12*  (2006.01)
*H04N 21/434*  (2011.01)
*H04N 21/236*  (2011.01)
*H04N 21/43*  (2011.01)

(52) U.S. Cl.
CPC ... *H04N 21/4343* (2013.01); *H04N 21/23605* (2013.01); *H04N 21/4307* (2013.01)

(58) Field of Classification Search
CPC .......... H04N 21/4343; H04N 21/4307; H04N 21/23605

USPC .................................................... 375/240.28
See application file for complete search history.

(56) References Cited

U.S. PATENT DOCUMENTS

2001/0022889 A1*  9/2001  Ohta .................. H04N 5/21
                                        386/264
2007/0110110 A1   5/2007  Miki et al.
2010/0142624 A1   6/2010  Fujita

FOREIGN PATENT DOCUMENTS

| JP | 9-107521 | 4/1997 |
|---|---|---|
| JP | 9-247633 | 9/1997 |
| JP | 2002-176643 | 6/2002 |
| JP | 2002-185929 | 6/2002 |

(Continued)

OTHER PUBLICATIONS

Written Opinion of the International Searching Authority (Form PCT/ISA/237), mailed in connection with PCT/JP2012/058427 and dated Jun. 26, 2012, with English translation (5 pages).

(Continued)

*Primary Examiner* — Allen Wong
(74) *Attorney, Agent, or Firm* — Fujitsu Patent Center

(57) ABSTRACT

At the time of an encoding process, a video elementary stream is generated and output by capturing and encoding a video image signal at a time interval of a video frame synchronous with a timing of a video synchronization signal, and an audio elementary stream is generated by capturing and encoding an audio signal at each audio interval. An audio packetized elementary stream where one packet has a stream length corresponding to the time interval of the video frame is multiplexed with the audio elementary stream, and the stream is output.

9 Claims, 15 Drawing Sheets

(56) References Cited

FOREIGN PATENT DOCUMENTS

| | | |
|---|---|---|
| JP | 2007-159092 | 6/2007 |
| JP | 2011-239009 | 11/2011 |
| WO | 2009-028038 | 3/2009 |

OTHER PUBLICATIONS

International Search Report for PCT/JP2012/058427 dated Jun. 26, 2012 (2 pages).

* cited by examiner

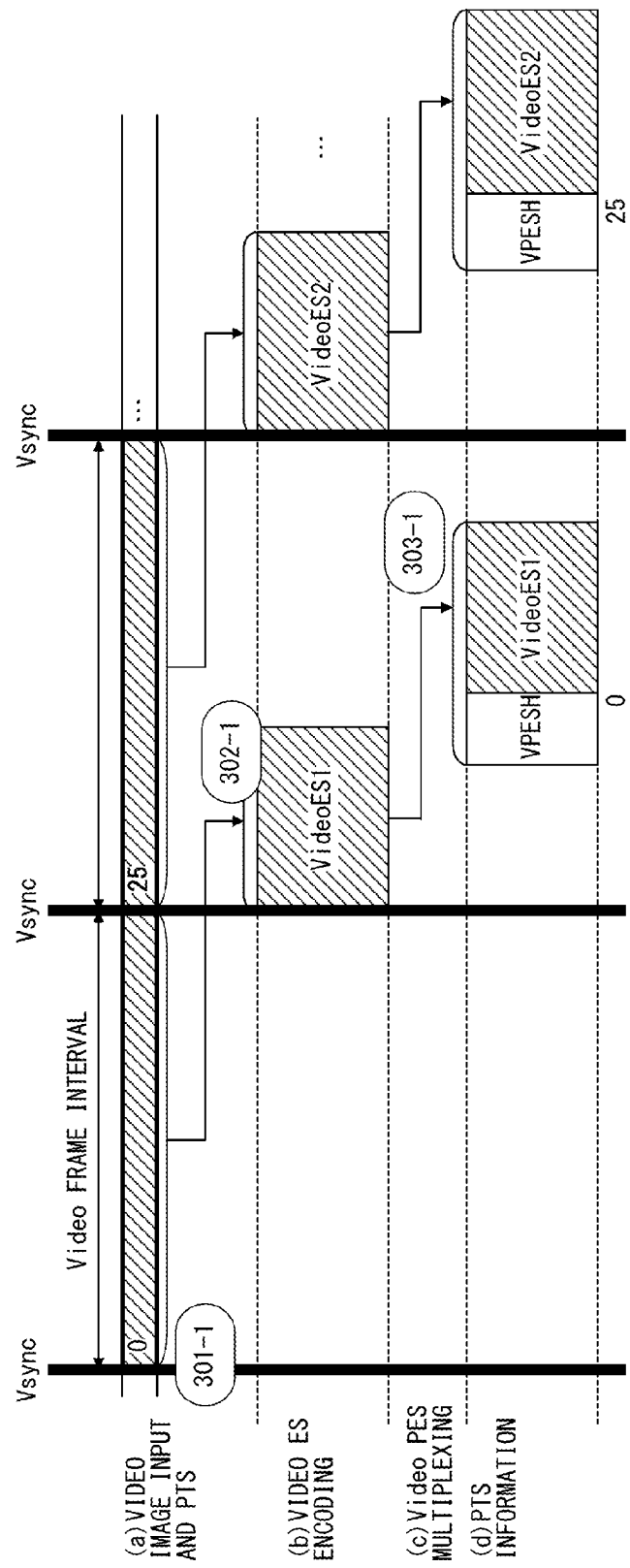
F I G. 3 A

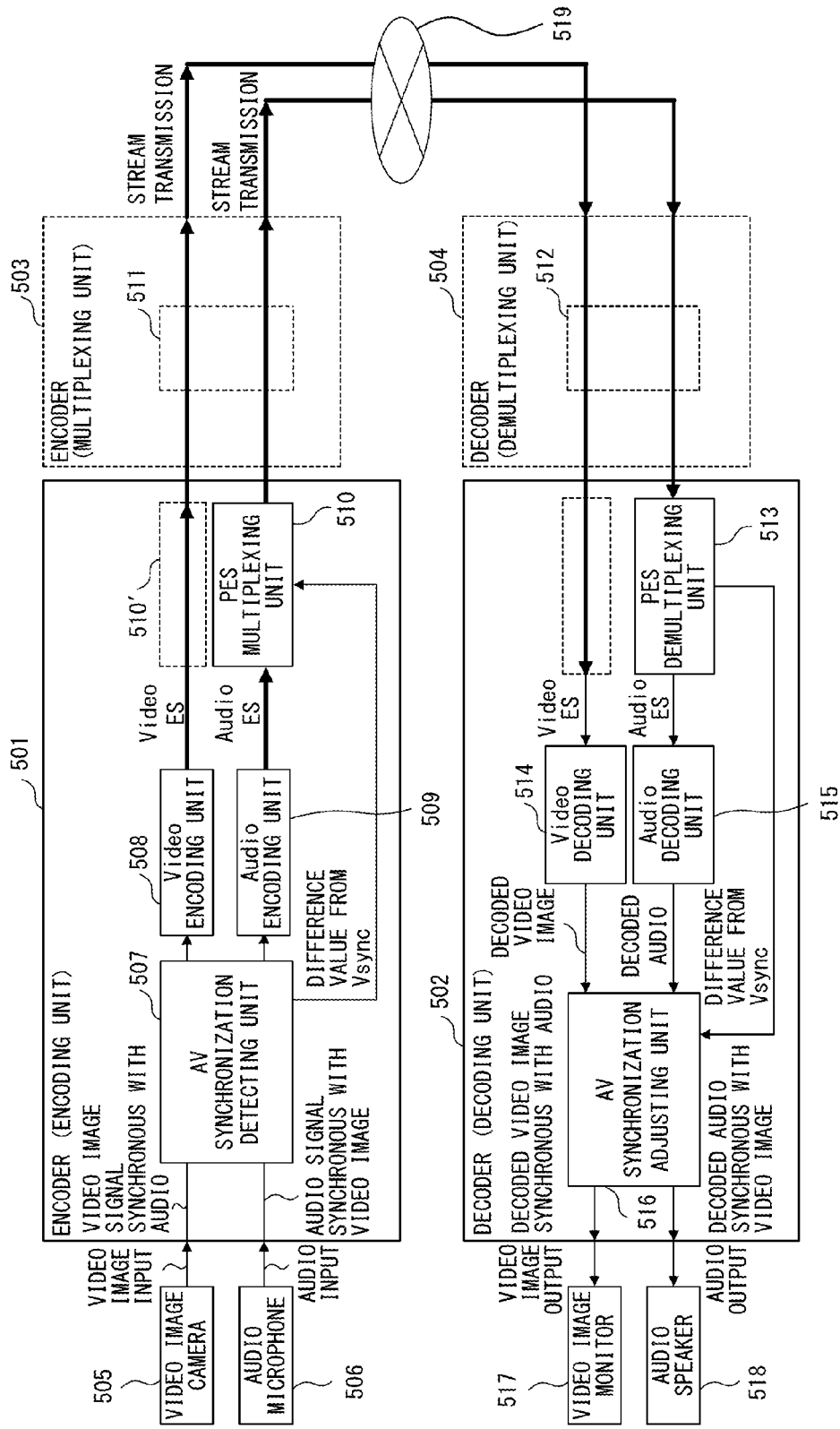
F I G. 5

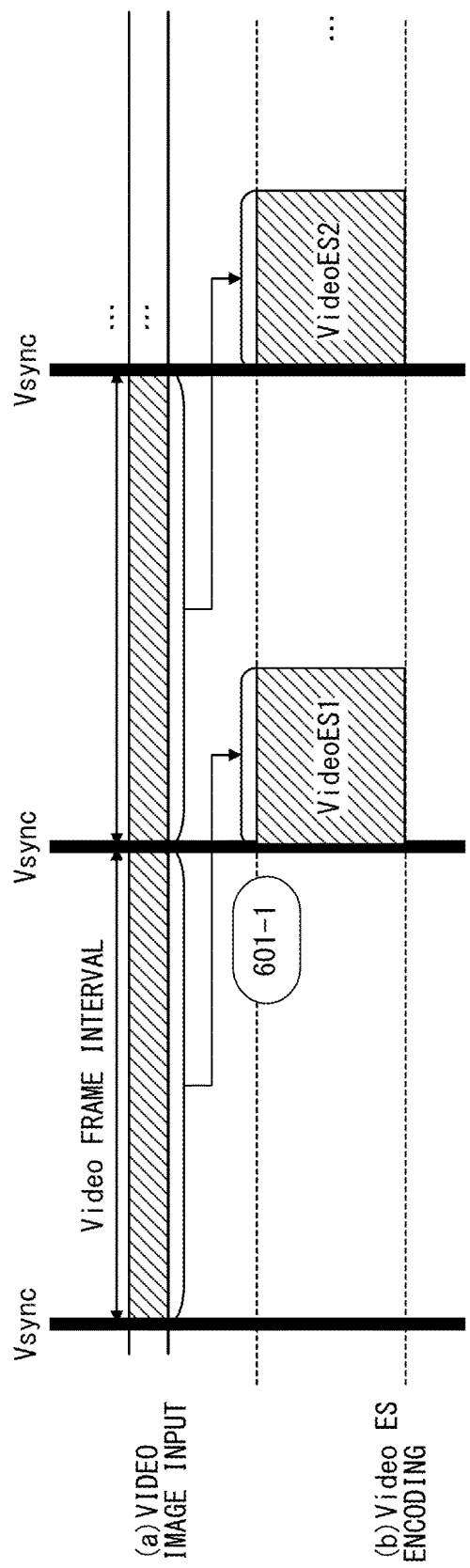

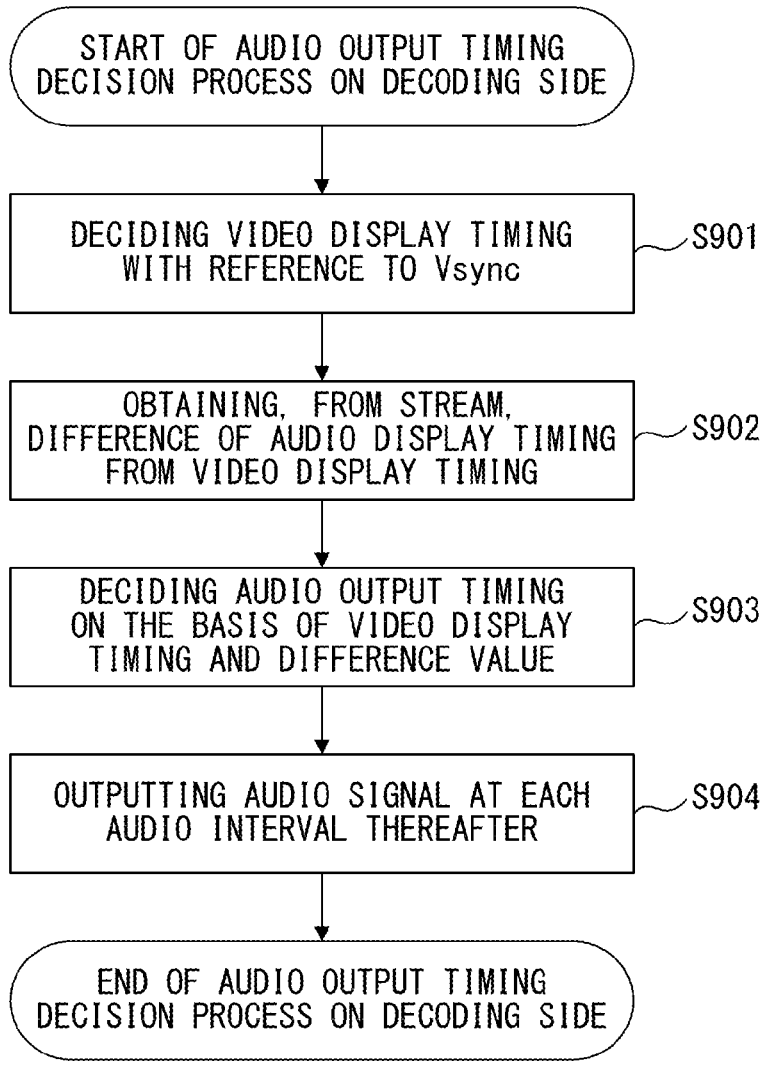
F I G. 9

ELEMENTARY STREAM MULTIPLEXING METHOD, MULTIPLEXING SYSTEM, ENCODING OR DECODING METHOD AND APPARATUS

CROSS-REFERENCE TO RELATED APPLICATION

This application is a continuation application of International Application PCT/JP2012/058427 filed on Mar. 29, 2012 and designated the U.S., the entire contents of which are incorporated herein by reference.

FIELD

The embodiments discussed herein are related to a method, an apparatus, and a program for encoding, multiplexing or decoding an elementary stream.

BACKGROUND

In recent years, in the development of video image and audio transmission systems, systems have been becoming complicated as a size of a transmitted video image grows and the number of functions is increased due to the diversification of audio compression and encoding methods. In the meantime, there is demand to further downsize and to consume less power. Accordingly, at the time of the development of the system, respectively partitioning and extracting functions of the system, developing the system in units of functions as modules. And a development method for configuring the system combining the modules according to functions equipped in the system is executed (for example, Japanese Laid-open Patent Publication No. 2007-159092 and Japanese Laid-open Patent Publication No. 2011-239009).

SUMMARY

A method for compressing and encoding a video image signal and an audio signal and for delivering the video image signal and the audio signal in a stream format includes, at the time of an encoding process: generating and outputting a video elementary stream by capturing and encoding the video image signal at a time interval of a video frame synchronous with a timing of a video synchronization signal; generating an audio elementary stream by capturing and encoding the audio signal at each audio interval at the time of the encoding process; and multiplexing an audio packetized elementary stream where one packet has a stream length corresponding to the time interval of the video frame with the audio elementary stream, and outputting the stream. The method further includes, at the time of a decoding process: decoding the video image signal with an input of the video elementary stream; demultiplexing the audio elementary stream with an input of the audio packetized elementary stream; decoding the audio signal from the audio elementary stream; and outputting the decoded video image signal and the decoded audio signal in synchronization with the video synchronization signal.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3A is an explanatory diagram of operational timings of a general encoding process;

FIG. 5 illustrates a configuration of an encoding/decoding system according to an embodiment;

FIG. 6A is an explanatory diagram of operational timings of an encoding process according to the embodiment;

FIG. 9 is a flowchart illustrating a starting process of the audio output timing decision process on a decoding side in the embodiment;

DESCRIPTION OF EMBODIMENTS

Figure 1:
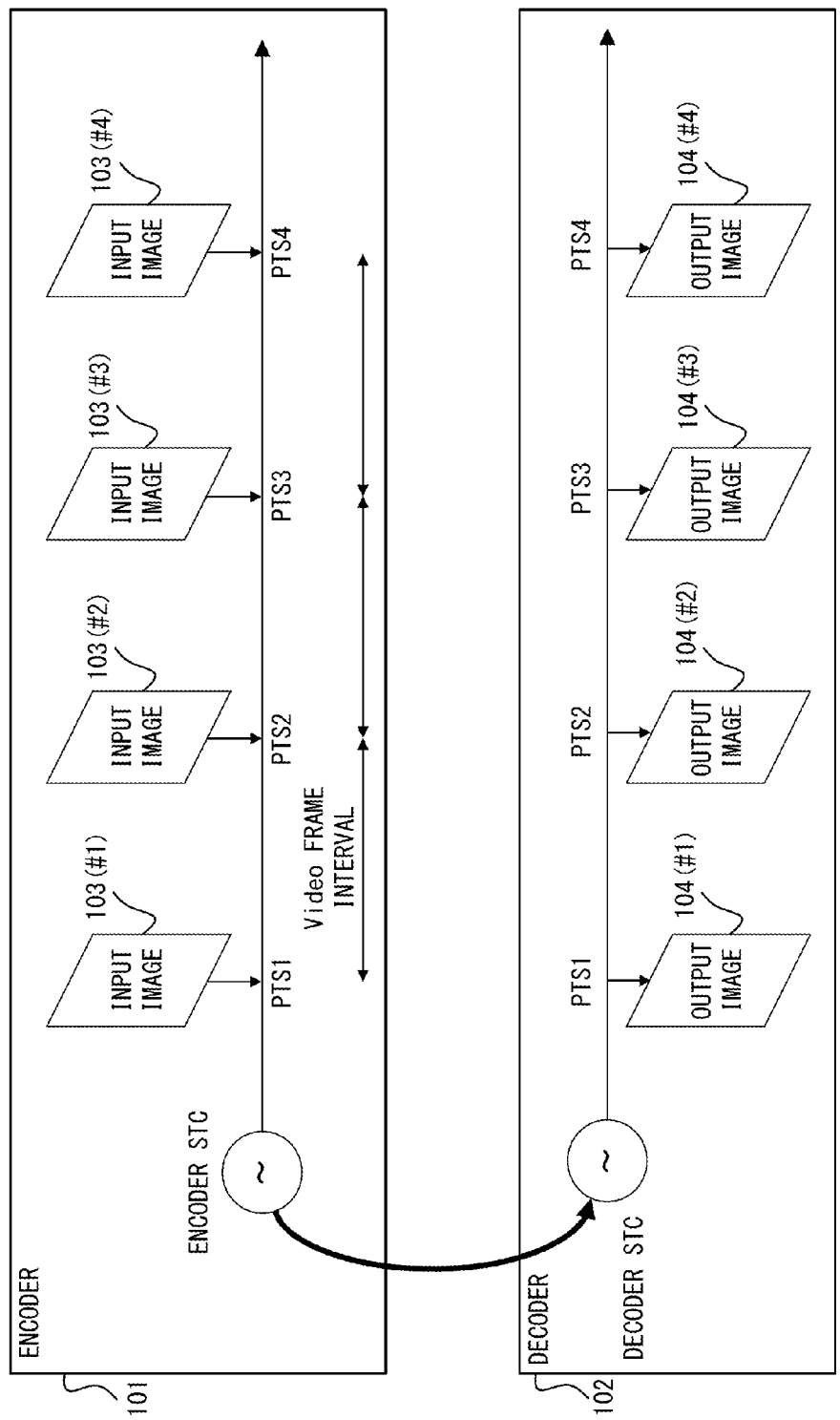
FIG. 1 is an explanatory diagram of a synchronization control performed in a general encoding/decoding process.

Embodiments for carrying out the present invention are described in detail below by referencing the drawings.

Synchronization between a video image and audio (hereinafter abbreviated to "AV synchronization") indicates a match made between the timing of a motion in a video image displayed on a video monitor and that of audio output from an audio speaker. A mismatch between the timings that is significant (5 milliseconds or more) results in an output where the video image and the audio are out of synchronization. As a result, this causes a viewer to feel that something is wrong.

As a standard for synchronizing a video image and audio in a video image and audio transmission system, a standard called MPEG-2 is presented. MPEG-2 was laid down in July, 1995 by the Moving Picture Experts Group (MPEG) of Joint Technical Committee 1 of the International Organization for Standardization and International Electrotechnical Commission. Moreover, this standard includes a standard called MPEG-2TS (MPEG-2 Transport Stream) that assumes the use of a video image and audio in broadcasting or a communication handled in an environment where an error may occur.

In accordance with the MPEG-2 standard, a video image signal and an audio signal are respectively encoded and converted into stream data called an elementary stream (ES: hereinafter referred to as an "ES"). An ES of a video image signal and that of an audio signal are respectively called a Video ES and an Audio ES. A Video ES and an Audio ES are respectively partitioned by a suitable size and multiplexed as packets. Each of these packets is called a PES (Packetized Elementary Stream). A PES obtained by packetizing a Video ES, and that obtained by packetizing an Audio ES are respectively called a Video PES and an Audio PES. A PES can include information of reproduction time of a video image signal or an audio signal, which is called a PTS (Presentation Time Stamp).

Additionally, in accordance with the MPEG-2TS standard, a PES packet is partitioned into packets each having a 188-byte fixed length, which is called a Transport Packet (also called a "TS packet"). A sequence of transport packets is transmitted on a communication path as a transport stream. A TS packet can include an identifier that indicates a video image or audio transmitted by the local packet. TS packets of the same video image or audio have the same identifier. Accordingly, a decoding side that has received TS packets can restore the packets to an original PES and ES by using the identifier. Moreover, a TS packet can include time stamp information called a PCR (Program Clock Reference: hereinafter referred to as a "PCR") that indicates the timing of a system time clock (hereinafter referred to as an "STC") on an encoding side. The decoding side can follow the STC on the encoding side by controlling an oscillation speed of the STC with a PLL (Phase Locked Loop) control on the basis of the time stamp information of the PCR and the arrival timing of a TS packet.

Furthermore, the decoding side synchronizes a video image and audio by outputting the video image signal and the audio signal, which are decoded from an ES included in each PES, at a timing according to the PTS, which is information of a reproduction time included in each PES, with reference to an STC reproduced as described above.

As a system that implements the above described functions of the MPEG-2TS, the following function units are used.

The function units described below are used as an encoder. The function units initially include an AV signal receiving unit that receives a video image signal and an audio signal. The function units also include an encoding unit that respectively encodes a video image signal and an audio signal, and outputs a Video ES and an Audio ES. The function units further include a PES multiplexing unit that respectively packetizes a Video ES and an Audio ES, and generates a Video PES and an Audio PES by adding to a header part of each packet a PTS corresponding to each of a Video ES and an Audio ES. The function units still further include a TS multiplexing unit that respectively partitions a Video PES and an Audio PES into TS packets, adds a PCR to a header of each of the TS packets, and transmits the TS packets as a stream.

Next, the function units described below are used as a decoder. The function units initially include a TS demultiplexing unit that extracts a Video PES and an Audio PES from a TS packet, and synchronizes an STC on the basis of a PCR within the TS packet. The function units also include a PES demultiplexing unit that respectively demultiplexes a Video ES and an Audio ES from a Video PES and an Audio PES, and extracts a PTS of each of the Video ES and the Audio ES. The function units further include a decoding unit that respectively decodes a Video ES and an Audio ES, and outputs a video image signal and an audio signal. The function units still further include an AV synchronization adjusting unit that respectively outputs the decoded video image signal and audio signal at a timing in accordance with a PTS extracted from a corresponding PES with reference to the synchronized STC.

When a system that performs a video image and audio transmission in an MPEG-2TS format is built, it is preferable to develop, as single units, modules that respectively implement the above described function units and to combine the modules in the encoder and the decoder.

However, the capacities of the multiplexing buffers needed for the TS multiplexing unit and the TS demultiplexing unit grow with an increase in an image size of the handled video.

Additionally, the modules are respectively developed and tested individually when being evaluated. Therefore, when an interface or the like of any of the modules is incompatible with that of another module, this problem is found after the modules are combined and checked. Consequently, the need for a reworking such as a modification of the modules arises.

The general idea of the configuration and operations of the MPTEG-2TS are described next. FIG. 1 is an explanatory diagram of a synchronization control performed in a general encoding/decoding process.

On the side of an encoder 101, for example, input images 103 #1 to #4, which are video image signals input at each reception timing of a video synchronization signal (hereinafter referred to as "Vsync") for each Video frame (hereinafter referred to as a "Video frame") are encoded. Then, on the side of a decoder 102, for example, output images 104 #1 to #4, which correspond to the input images 103 #1 to #4, are decoded and output.

Here, assume that values of a time stamp, namely, a system time clock (hereinafter referred to as an "encoder STC") on the side of the encoder, which corresponds to a Vsync reception timing of the input images 103 #1 to #4, are PTS1, PTS2, PTS3, and PTS4. In accordance with the MPEG-2TS standard, generally, for example, the input images 103 #1 to #4 are encoded and respectively converted into a Video ES, which is then packetized into each Video PES. At this time, for example, the above described PTS1, PTS2, PTS3, or PTS4 is attached to a header part of each video PES, which is then transmitted.

On the side of the decoder 102, each Video ES and each PTS (such as PTS1, PTS2, PTS3, PTS4) are extracted from each received PES, and, for example, the output images 104 #1 to #4 are decoded from each Video ES. Then, for example, each of the output images 104 #1, #2, #3 and #4 is output at a timing at which the value of an STC on the side of the decoder 102 (hereinafter referred to as a "decoder STC") matches, for example, PTS1, PTS2, PTS3, or PTS4.

Here, generally, a clock frequency accuracy of an encoder STC and that of a decoder STC may differ slightly. Therefore, in accordance with the MPEG-2TS standard, PES packets generated, for example, from the input images 103 #1 to #4 are partitioned into packets, each of which has a 188-byte fixed length and is called a TS packet; these are not particularly illustrated. A sequence of these TS packets is transmitted on a communication path as a transport stream. Each TS packet can include time stamp information of the PCR, which indicates the timing of the encoder STC. The decoder 102 side can follow the encoder STC by controlling an oscillation speed of the decoder STC with a PLL control on the basis of the time stamp information of the PCR and arrival timing of a TS packet.

FIG. 1 illustrates only the processes executed for the input images 103 and the output images 104, which are video image signals. However, similar processes are executed for audio signals.

Figure 2:
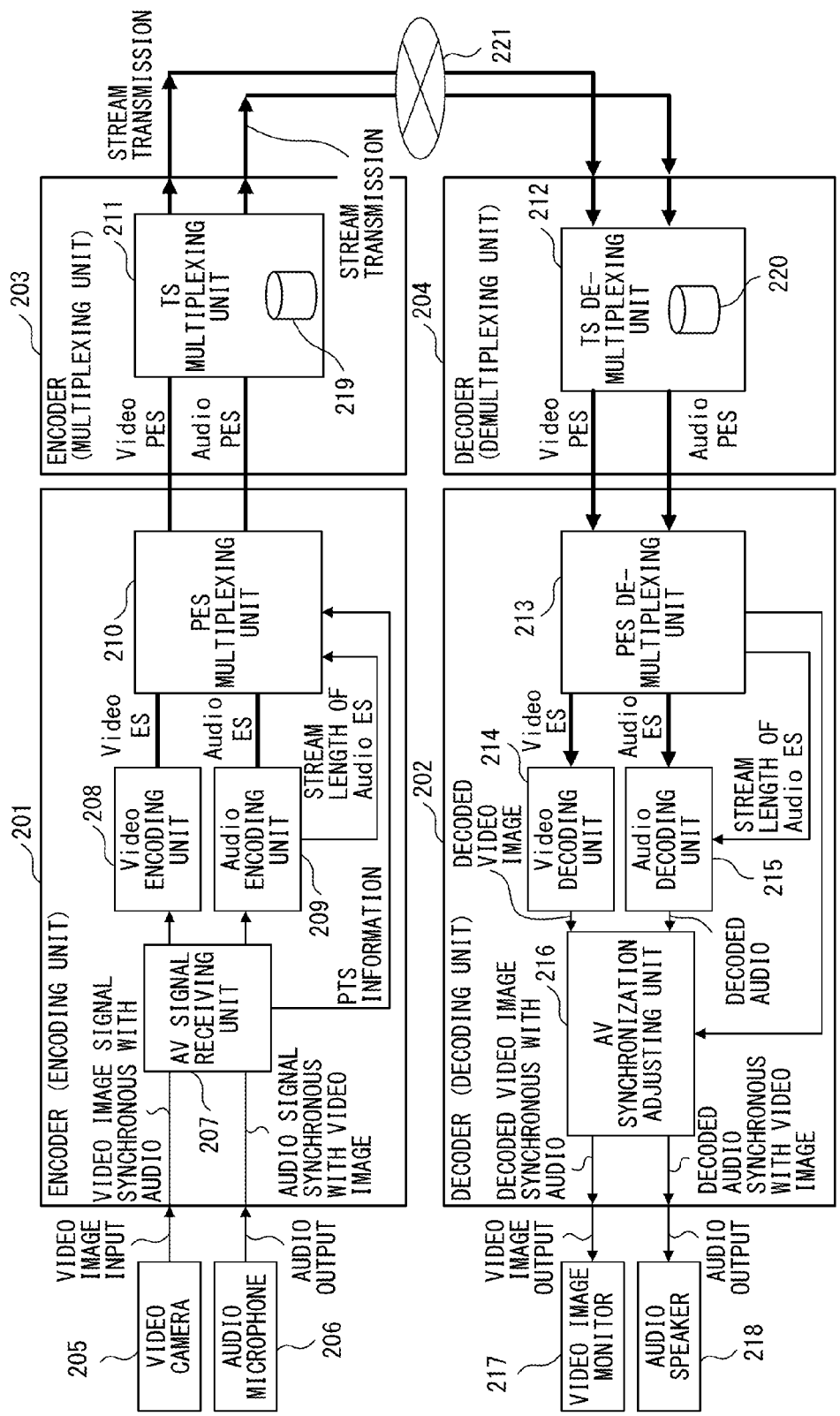
FIG. 2 illustrates a configuration of a general encoding/decoding system.

FIG. 2 illustrates a configuration of a general encoding/decoding system.

An encoder unit includes an encoder (encoding unit) 201 and an encoder (multiplexing unit) 203. A decoder unit includes a decoder (decoding unit) 202 and a decoder (demultiplexing unit) 204.

The encoder (encoding unit) 201 includes an AV signal receiving unit 207, a Video encoding unit 208, an Audio encoding unit 209, and a PES multiplexing unit 210. The encoder (multiplexing unit) 203 includes a TS multiplexing unit 211.

The AV signal receiving unit 207 synchronizes a video image signal from a video camera 205 and an audio signal from an audio microphone 206, and receives the signals.

The Video encoding unit 208 generates a Video ES by capturing and encoding video image signals at time intervals of a Video frame synchronous with the Vsync timing.

The Audio encoding unit 209 generates an Audio ES by capturing and encoding audio signals.

The PES multiplexing unit 210 generates a Video PES and an Audio PES by respectively packetizing a Video ES and an Audio ES. At this time, the PES multiplexing unit 210 adds, as respective PTSs, each value of the encoder STC at an input timing of the Video ES or the Audio ES to each header part of the Video ES and the Audio ES (see FIG. 1).

The TS multiplexing unit 211 respectively partitions the Video PES and the Audio PES into TS packets, and transmits the partitioned packets as a stream on a transmission line 221. At this time, the TS multiplexing unit 211 adds, as a PCR, timing information of the encoder STC (see FIG. 1) to the header part of each of the TS packets.

The transmission line 221 is a wireless or wired transmission line (such as a metal line, an optical fiber or the like).

The decoder (demultiplexing unit) 204 includes a TS demultiplexing unit 220. The decoder (decoding unit) 202 includes a PES demultiplexing unit 213, a Video decoding unit 214, an Audio decoding unit 215, and an AV synchronization adjusting unit 216.

The TS demultiplexing unit 220 receives TS packets from the transmission line 221, extracts a Video PES and an Audio PES from each TS packet, and synchronizes the decoder STC (see FIG. 1) on the basis of a PCR within each TS packet.

The PES demultiplexing unit 213 demultiplexes a Video ES and an Audio ES respectively from the Video PES and the Audio PES, and extracts a PTS of each of the Video ES and the Audio ES.

The Video decoding unit 214 outputs a video image signal by decoding the Video ES.

The Audio decoding unit 215 outputs an audio signal by decoding the Audio ES.

The AV synchronization adjusting unit 216 respectively outputs, to the video monitor 217 and the audio speaker 218, the decoded video image signal and audio signal at a timing at which the value of the decoder STC (see FIG. 1) matches a PTS extracted from a corresponding PES.

Figure 3B:
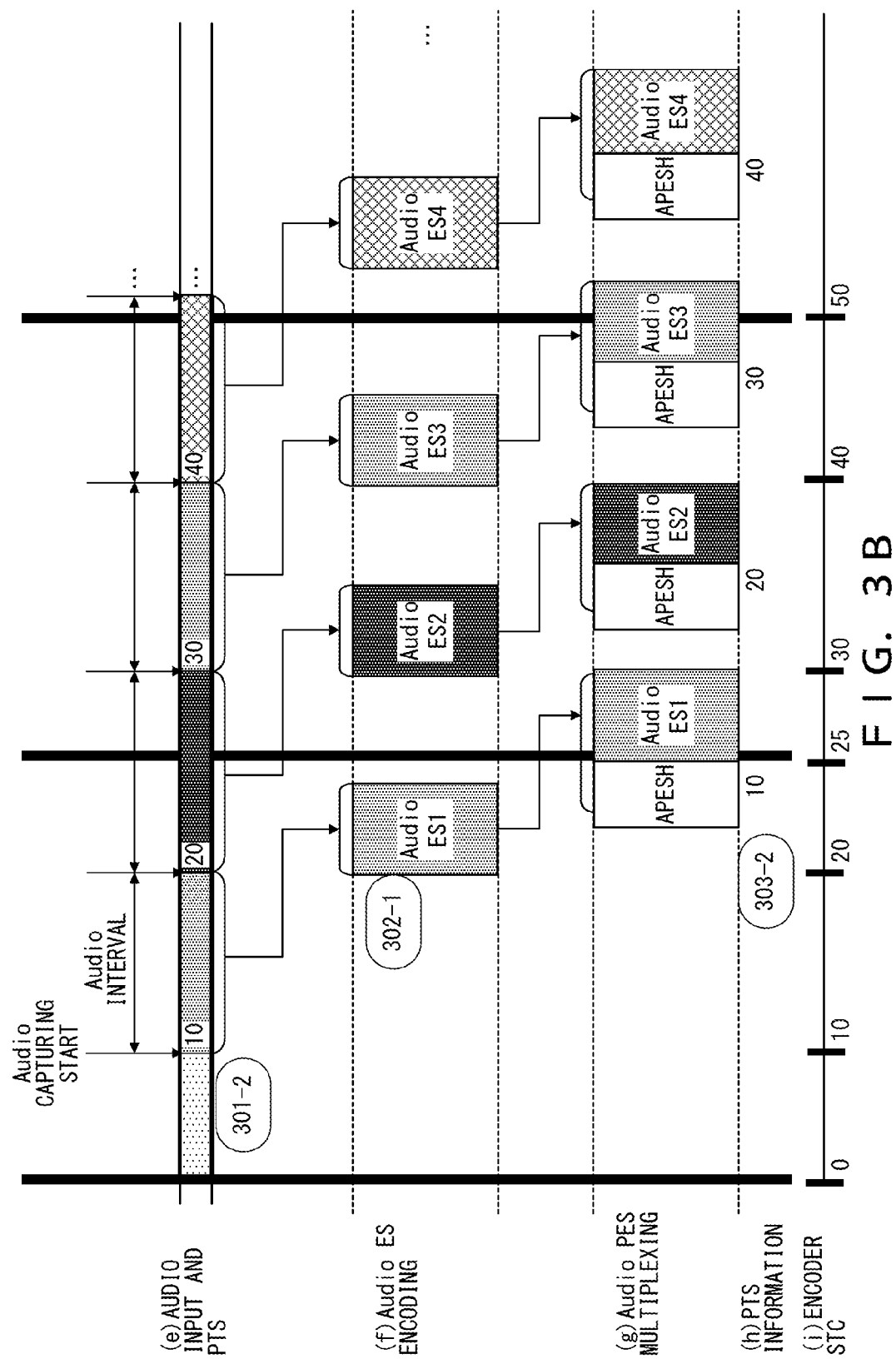
FIG. 3B is an explanatory diagram of operational timings of a general encoding process.

FIGS. 3A and 3B are explanatory diagrams of operational timings of an encoding process executed in the general encoding/decoding system illustrated in FIG. 2.

A video image signal input to the AV signal receiving unit 207 of FIG. 2 is input in synchronization with the encoder STC (see FIG. 1) of FIG. 3B(i), and a with a Vsync synchronous with the encoder STC as represented by FIG. 3A(a).

At this time, in the example of FIG. 3A(a), a PTS at each Vsync timing is a time stamp where the value of the encoder STC is 0, 25, 50 or the like.

Video image signals by one Video frame interval, which are input, for example, at a timing represented by 301-1 of FIG. 3(a), start to be encoded at the next Vsync timing PTS=25 delayed by one Video frame as represented by 302-1 of FIG. 3A(b). As a result, for example, Video ES1 is obtained as a Video ES.

Then, as represented by 303-1 of FIG. 3A(c), a Video ES1 is packetized into PES packets, so that a Video PES is generated by the PES multiplexing unit 210 of FIG. 2. At this time, for example, PTS=0 (FIG. 3A(d)) is added as a Video PES header VPESH. This PTS value is an encoder STC value (FIG. 3B(i)) at the input start timing of a video image signal corresponding to the Video ES1 as represented by 301-1 of FIG. 3A(a). Thus generated Video PES including the Video ES1 and PTS=0 is output to the TS multiplexing unit 211 of FIG. 2, and transmitted on the transmission line 221.

Similarly, video image signals of one Video frame, which are input at the Vsync timing PTS=25 of FIG. 3A(a), start to be encoded at the Vsync timing PTS=50, so that a Video ES2 is obtained (FIG. 3A(b)). Then, a Video PES where PTS=25 is added as a VPESH header is generated (FIGS. 3A(c) and 3A(d)). In this way, the Video PES where the Video ES2 and PTS=25 are added is output to the TS multiplexing unit 211 of FIG. 2, and is transmitted on the transmission line 221.

In the meantime, audio signals start to be input to the AV signal receiving unit 207 of FIG. 2, for example, at a capturing start timing of PTS=10 as represented by 301-2 of FIG. 3B(e) in synchronization with the encoder STC (see FIG. 1) of FIG. 3B(i).

Next, the Audio encoding unit 209 of FIG. 2 encodes an audio signal at each audio interval, such as PTS=10, 20, 30, 40, . . . , as represented by FIG. 3B(e) delayed by one Audio interval. This Audio interval is a length of an audio analysis frame. As a result, for example, Audio ES1, Audio ES2, Audio ES3, Audio ES4, . . . are sequentially generated as Audio ESs as represented by 302-1 of FIG. 3B(f).

Then, as represented by 303-2 of FIG. 3B(g), the audio ESs are sequentially packetized into PES packets by the PES multiplexing unit 210 of FIG. 2, so that Audio PESs are generated. At this time, for example, PTS=10, 20, 30, 40, . . . (FIG. 3B(h)) is added as an Audio PES header APESH. These PTS values are an encoder STC value (FIG. 3B(i)) at each input start timing of an audio signal corresponding to each audio ES represented by 301-2 of FIG. 3B(e). A thus generated Audio PES including each audio ES and each PTS value is output to the TS multiplexing unit 211 of FIG. 2, and transmitted on the transmission line 221.

Figure 4A:
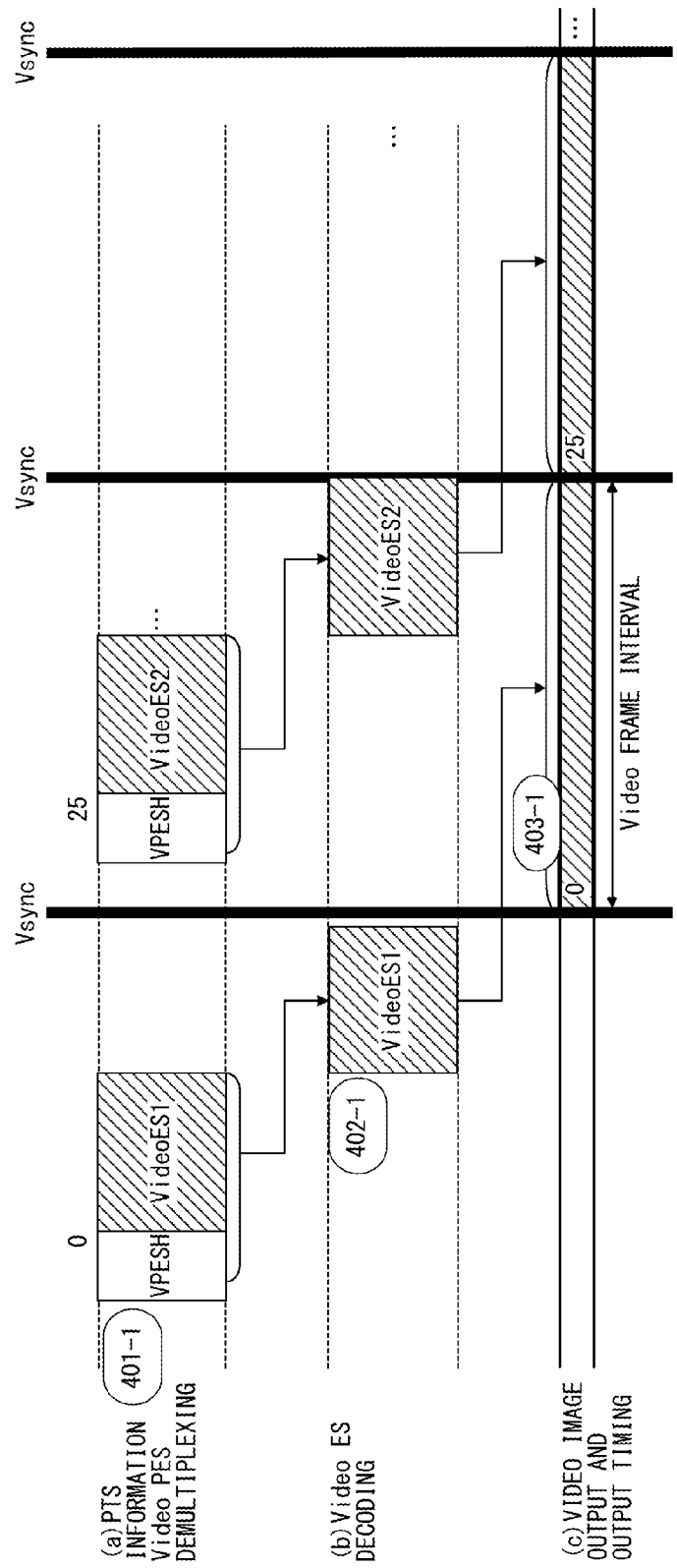
FIG. 4A is an explanatory diagram of operational timings of a general decoding process.
Figure 4B:
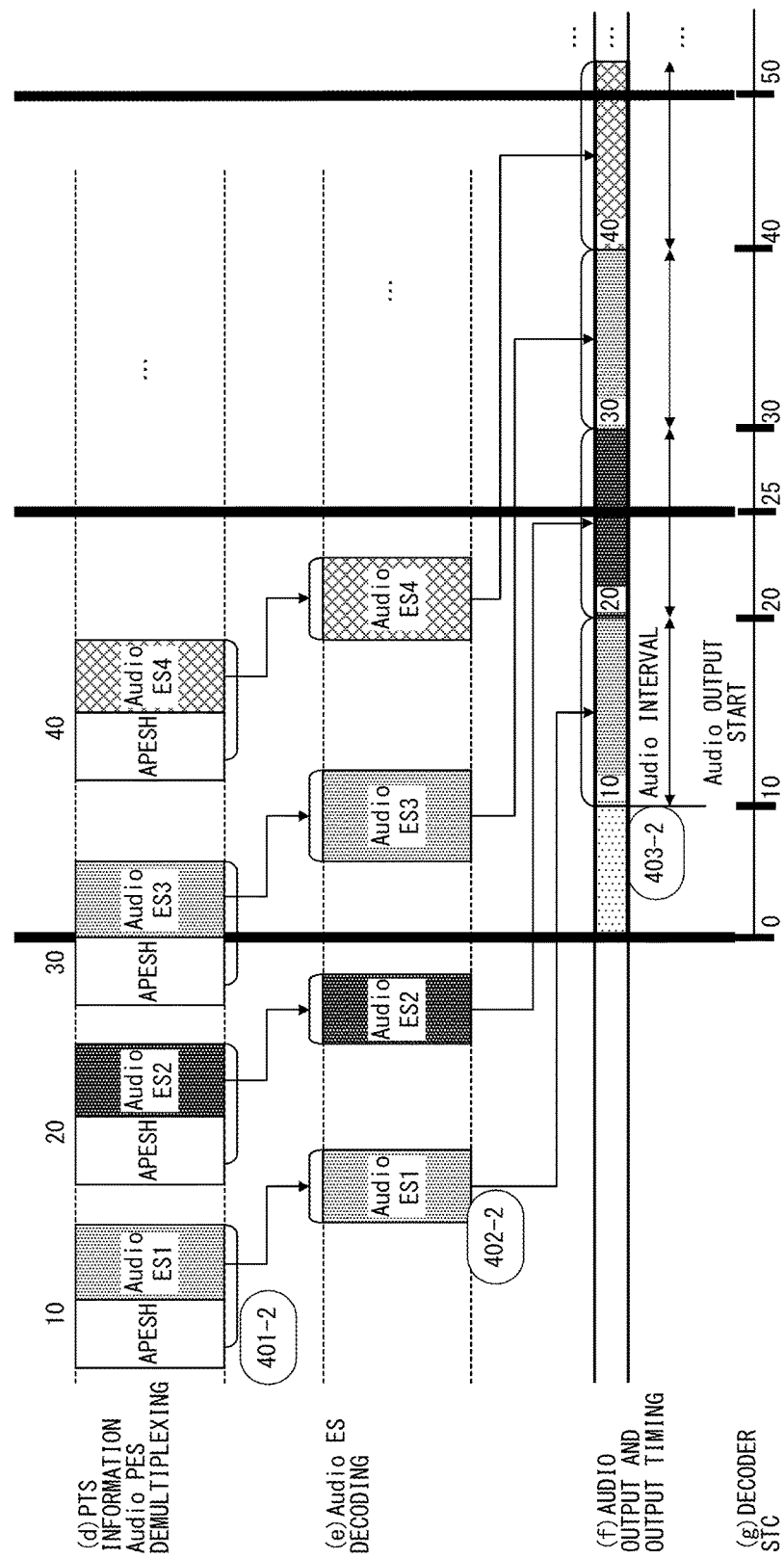
FIG. 4B is an explanatory diagram of operational timings of a general decoding process.

FIGS. 4A and 4B are explanatory diagrams of operational timings of a decoding process executed in the general encoding/decoding system illustrated in FIG. 2.

A Video PES input from the TS demultiplexing unit 220 to the PES demultiplexing unit 213 in FIG. 2 is input as represented by FIG. 4A(a).

Next, a Video PES including a Video ES1 and PTS=0, which is input, for example, at the timing of 401-1 of FIG. 4A(a), is demultiplexed by the PES demultiplexing unit 213 of FIG. 2 as represented by 402-1 of FIG. 4A(b). As a result, the Video ES1 and information of PTS=0 of one Video frame are extracted. The Video ES1 is decoded into video image signals by the Video decoding unit 214 of FIG. 2.

Here, the decoder STC starts to output a clock in synchronization with a PCR demultiplexed by the TS demultiplexing unit 220 of FIG. 2, for example, at a timing represented by FIG. 4B(g).

In the meantime, the AV synchronization adjusting unit 216 of FIG. 2 starts to output the video image signals by one Video frame at a time, the Video frame corresponding to the Video ES1 that is extracted and decoded, for example at the timing of 402-1 of FIG. 4A(b). In this case, the AV synchronization adjusting unit 216 starts to output the signals at a timing at which the decoder STC value of FIG. 4B(g) matches PTS=0 demultiplexed at the timing of 402-1 of FIG. 4A(b), as represented by FIG. 4A(c).

Similarly, the Video PES that includes the Video ES2 and PTS=25 and is input at the next timing is demultiplexed as represented by FIG. 4A(b), and the Video ES2 is decoded into video image signals by one Video frame. Then, the video image signals start to be output at a timing at which the decoder STC value of FIG. 4B(g) matches the above demultiplexed PTS=25.

In the meantime, the Audio PES input to the PES multiplexing unit 210 of FIG. 2 is input as represented by FIG. 4B(d).

Next, the Audio PES that includes the Audio ES1 and PTS=10 and is input, for example, at the timing of 401-2 of FIG. 4B(d) is demultiplexed by the PES demultiplexing unit 213 of FIG. 2 as represented by 402-2 of FIG. 4B(e). As a result, the Audio ES1 and the information of PTS=10 of one Audio interval (audio frame) are extracted. The Audio ES1 is decoded into audio signals by the Audio decoding unit 215 of FIG. 2.

In the meantime, the AV synchronization adjusting unit 216 starts to output the audio signals of one Audio interval (audio frame) corresponding to the Audio ES1 extracted and decoded, for example, at the timing of 402-2 of FIG. 4B(e). In this case, the AV synchronization adjusting unit 216 starts to output the audio signals at a timing at which the decoder STC value of FIG. 4B(g) matches PTS=10 demultiplexed by the 402-2 of FIG. 4B(e) as represented by FIG. 4B(f).

Similarly, each of the Audio PESs that is input at each timing, including the Audio ES2 and PTS=20, Audio ES3 and PTS=30, Audio ES4 and PTS=40, . . . , is demultiplexed as represented by FIG. 4B(e). Then, each of the Audio ESs is decoded into audio signals of one Audio interval (audio frame). Next, each of the audio signals is output at each timing at which the decoder STC value of FIG. 4B(g) matches the respectively demultiplexed PTS=20, 30, 40, . . . , as represented by FIG. 4A(c).

As described above, in the general configuration of the encoding/decoding system illustrated in FIG. 2, the PES multiplexing unit 210 and the PES demultiplexing unit 213 need to execute the conversion process between a Video ES and a Video PES, and that between an Audio ES and an Audio PES. Moreover, the TS multiplexing unit 211 and the TS demultiplexing unit 220 need to execute a conversion process between a Video PES and a TS packet, and that between an Audio PES and a TS packet.

In this case, especially, the growing capacities of the multiplexing buffers 219 and 220 needed for the TS multiplexing unit 211 and the TS demultiplexing unit 220 become problematic, leading to an increase in the size and the cost of the system.

To solve this problem, an embodiment described below enables the number of modules of the entire system to be reduced by implementing a system configuration that can omit the TS multiplexing and demultiplexing processes, and the PES multiplexing and demultiplexing processes for a Video ES and a Video PES.

FIG. 5 illustrates a configuration of an encoding/decoding system according to the embodiment.

An encoder unit includes an encoder (encoding unit) 501. A decoder unit includes a decoder (decoding unit) 502. Of the configurations generally considered in FIG. 2, the portions within dotted lines 503 and 511, which correspond to the encoder (multiplexing unit) 203 and the TS multiplexing unit 211 within the encoder 203, and those of 504 and 512, which correspond to the decoder (demultiplexing unit) 204 and the TS demultiplexing unit 220 within the decoder 204, may become unnecessary.

The encoder (encoding unit) 501 includes an AV synchronization detecting unit (synchronization detecting unit) 507, a Video encoding unit 508, an Audio encoding unit 509, and a PES (packetized elementary stream) multiplexing unit 510.

The AV synchronization detecting unit 507 synchronizes a video image signal from a video camera 505 and an audio signal from an audio microphone 506, and receives the synchronized signals. Moreover, the AV synchronization detecting unit 507 outputs a difference value from the timing of a video synchronization signal (Vsync) to capturing a start timing of an audio signal.

The Video encoding unit 508 generates a video elementary stream (Video ES) by capturing and encoding video image signals at intervals of a Video frame synchronous with the Vsync timing. This Video ES is output to a transmission line 519 unchanged.

The Audio encoding unit 509 generates an audio elementary stream (Audio ES) by capturing and encoding audio signals at audio intervals.

The PES multiplexing unit 510 generates an audio packetized elementary stream (Audio PES) by packetizing an Audio ES. At this time, the PES multiplexing unit 510 packetizes an Audio ES so that one packet may have a stream length corresponding to the time interval of a Video frame. Unlike the PES multiplexing unit 210 of FIG. 2, the PES multiplexing unit 510 does not packetize a Video ES output from the video encoding unit 508 into a PES packet. In other words, a portion within dotted lines 510' of FIG. 5 becomes unnecessary. An Audio PES output from the PES multiplexing unit 210 is output to the transmission line 519 unchanged without being packetized into a TS packet. The PES multiplexing unit 510 generates a dummy audio elementary stream (Dummy ES) having a stream length corresponding to a difference value when the AV synchronization detecting unit 507 outputs the difference value from the Vsync timing to the capturing start timing of an audio signal. Then, the PES multiplexing unit 510 multiplexes the Audio PES with the generated Dummy ES.

The transmission line 519 is a wired or wireless transmission line (such as a metal line, an optical fiber or the like).

The decoder (decoding unit) 502 includes a Video decoding unit 514, a PES (packetized elementary stream) demultiplexing unit 513, an Audio decoding unit 515, and an AV synchronization adjusting unit 516.

To the Video decoding unit 514, a Video ES from the transmission line 519 is input. Then, the Video decoding unit 514 decodes a video image signal.

To the PES demultiplexing unit 513, an Audio PES is input from the transmission line 519. Then, the PES demultiplexing unit 513 demultiplexes the Audio PES into Audio ESs at Audio intervals. The PES demultiplexing unit 513 outputs a difference value from the Vsync timing superposed on the encoding side to the capturing start timing of an audio signal on the basis of a stream length of a Dummy ES when the Audio PES is multiplexed with the Dummy ES.

The Audio decoding unit 515 decodes an audio signal from the Audio ES demultiplexed by the PES demultiplexing unit 513.

The AV synchronization adjusting unit 516 respectively outputs, to the video monitor 517 and the audio speaker 518, the video image signal decoded by the Video decoding unit 514 and the audio signal decoded by the Audio decoding unit 515 in synchronization with Vsync. The AV synchronization adjusting unit 516 performs the following operation when the PES demultiplexing unit 513 outputs the difference value from the Vsync timing superposed on the encoding side to the capturing start timing of the audio signal. The AV synchronization adjusting unit 516 outputs an audio signal obtained by decoding the Audio ES demultiplexed by the PES demultiplexing unit 513 subsequently to the Dummy ES at a timing delayed from the Vsync timing by the difference value.

Figure 6B:
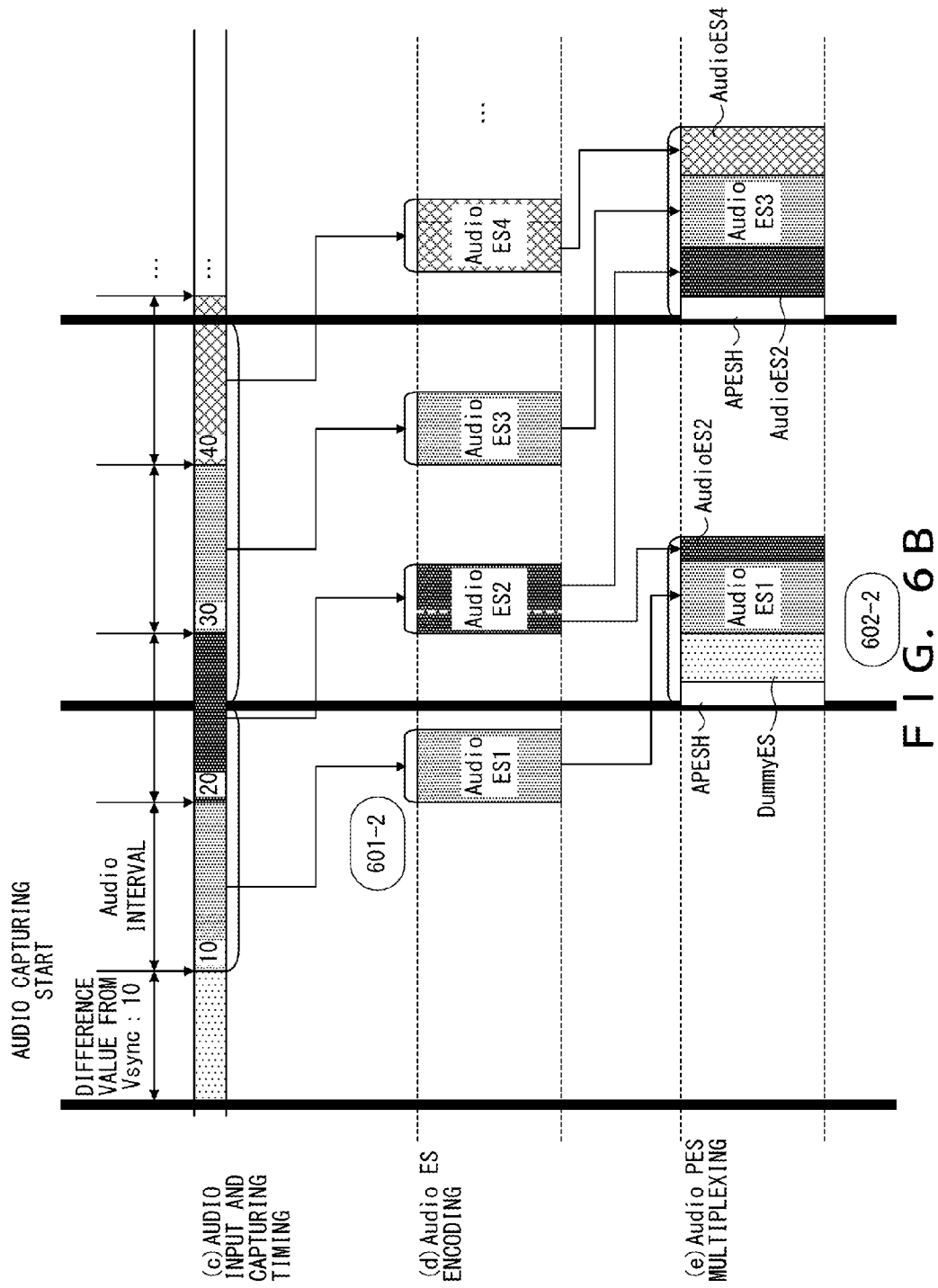
FIG. 6B is an explanatory diagram of operational timings of an encoding process according to the embodiment.

FIGS. 6A and 6B are explanatory diagrams of operational timings of an encoding process executed in the encoding/decoding system according to the embodiment illustrated in FIG. 5.

A video image signal input to the AV synchronization detecting unit 507 of FIG. 5 is input in synchronization with Vsync as represented by FIG. 6A(a). Video image signals of one Video frame interval which are each input at one Vsync timing start to be encoded by the Video encoding unit 508 at the next Vsync timing delayed by one Video frame as represented by 601-1 of FIG. 6A(b). As a result, for example, Video ES1, Video ES2, . . . are obtained as Video ESs.

Thus obtained Video ESs are sequentially transmitted to the transmission line 519 unchanged without being packetized into PES packets.

In the meantime, in the AV synchronization detecting unit 507 of FIG. 5, an audio signal from the audio microphone 506 is input, for example as represented by FIG. 6B(c). In response to the input, the AV synchronization detecting unit 507 outputs a difference value from the Vsync timing to the capturing start timing of the audio signal at the capturing start timing of the audio signal. In the example of FIG. 6B(c), the AV synchronization detecting unit 507 outputs a difference value=10 since the capturing start timing of the audio signal is shifted from Vsync by 10 milliseconds.

Next, the Audio encoding unit 509 of FIG. 5 encodes audio signals at Audio intervals such as 10, 20, 30, 40, . . . (FIG. 6B(c)) with reference to the Vsync timing after the audio signals start to be captured as represented by 601-2 of FIG. 6B(d). The audio intervals correspond to a length of an audio analysis frame. As a result, the Audio encoding unit 509 sequentially outputs Audio ES1, Audio ES2, Audio ES3, Audio ES4, . . . as Audio ESs.

Then, the PES multiplexing unit 510 of FIG. 5 generates an Audio PES by packetizing each of the Audio ESs. At this time, the PES multiplexing unit 510 reconfigures and multiplexes the Audio ES1 to the Audio ES4 so that one packet has a stream length after being encoded which corresponds to the time interval of a Video frame, as represented by 6(e). Moreover, the PES multiplexing unit 510 generates a Dummy ES having a stream length corresponding to the difference value when the AV synchronization detecting unit 507 of FIG. 5 outputs the difference value from the Vsync timing to the capturing start timing of the audio signal. Then, the PES multiplexing unit 510 multiplexes the Audio PES with the generated Dummy ES as represented by 602-2 of FIG. 6B(e). In this example, the stream length of the Dummy ES results in a stream length that corresponds to the difference value=10 after being encoded. In the case of this embodiment, information that indicates each packet length is added to a header part APESH of each audio PES. However, it is not necessary to add a PTS for which an encoder STC value indicating each input start timing of an audio signal is used as a reference. Thusly generated Audio PESs are transmitted to the transmission line 519.

Figure 7A:
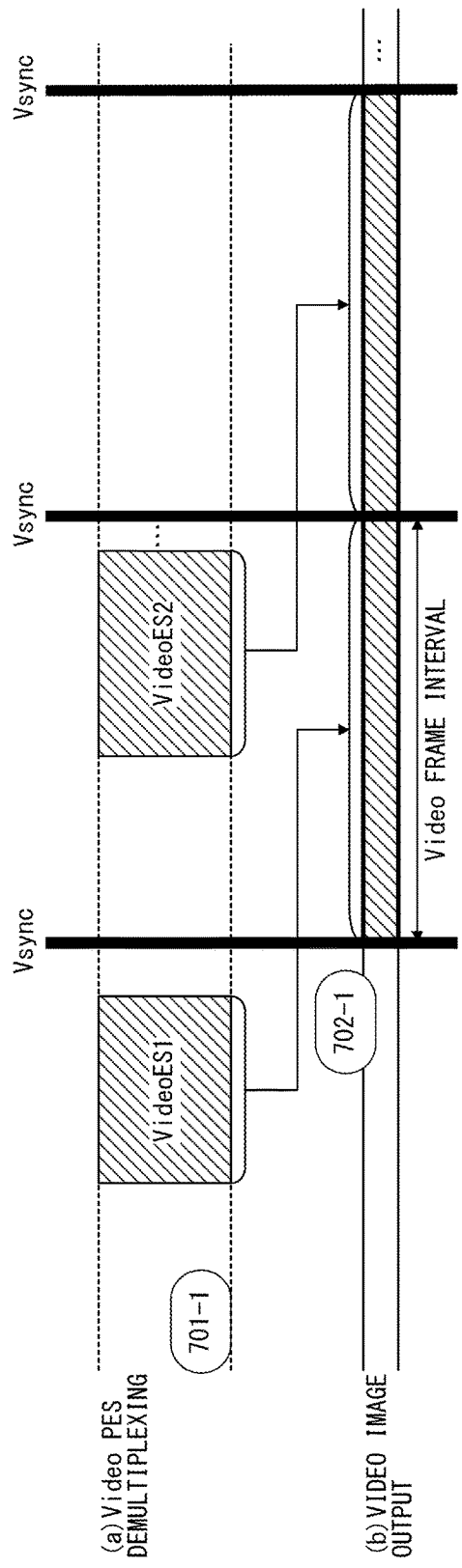
FIG. 7A is an explanatory diagram of operational timings of a decoding process according to the embodiment.
Figure 7B:
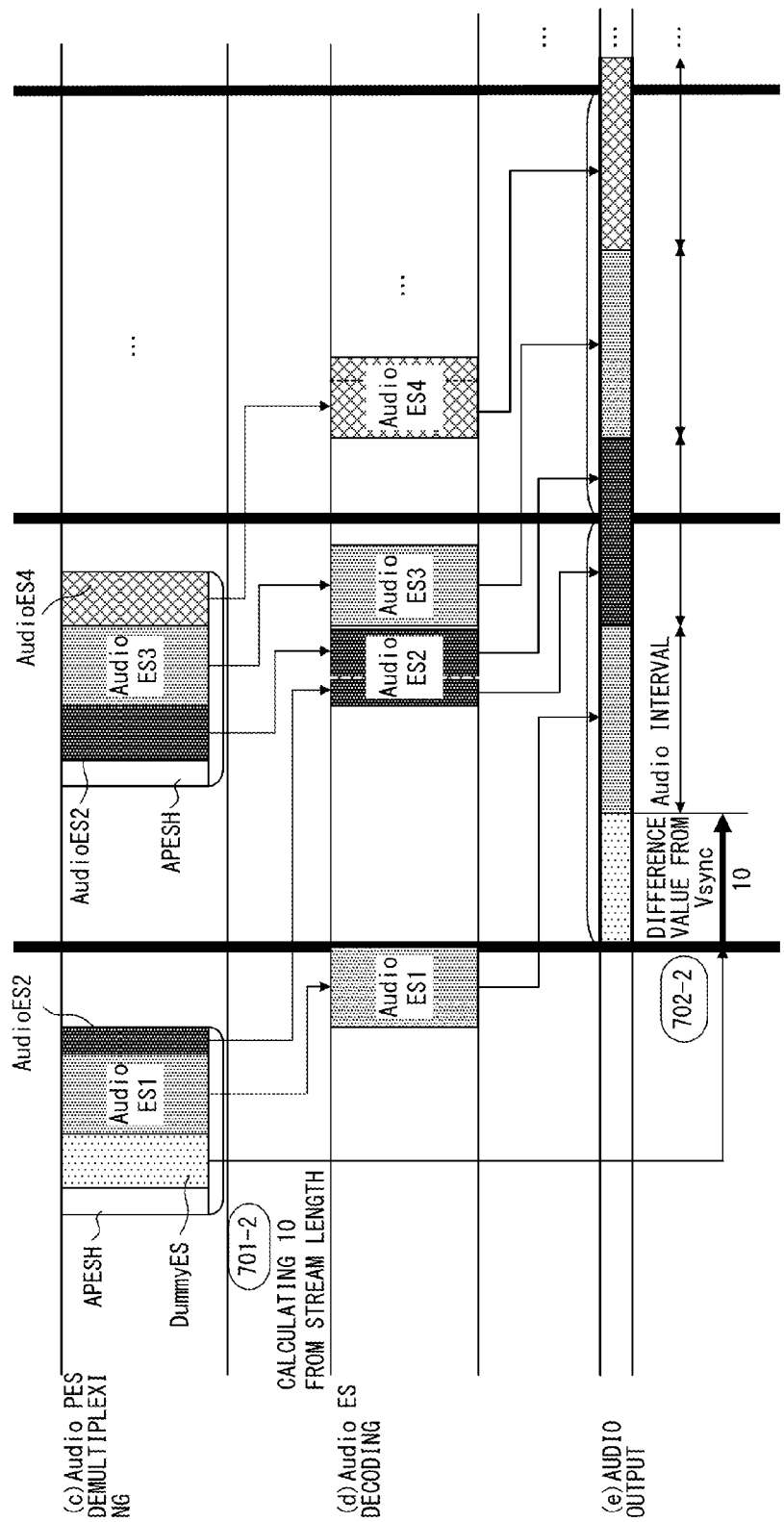
FIG. 7B is an explanatory diagram of operational timings of a decoding process according to the embodiment.

FIGS. 7A and 7B are explanatory diagrams of operational timings of a decoding process executed in the encoding/decoding system according to the embodiment illustrated in FIG. 5.

A Video ES input from the transmission line 519 of FIG. 5 to the Video decoding unit 514 is input with a stream length corresponding to a Video frame interval as represented by 701-1 of FIG. 7A(a). Since it is not necessary to transmit a PCR (Program Clock Reference) that indicates the timing of an encoder STC in this embodiment, a TS packet does not need to be multiplexed (the dotted line portion 512 of FIG. 5). Moreover, it is not necessary to also transmit PTS (Presentation Time Stamp) time stamp information. Since a Video ES is transmitted without being packetized, a Video ES does not need to be demultiplexed from a Video PES.

Next, the AV synchronization adjusting unit 516 of FIG. 5 performs the following output timing control when video image signals decoded by the Video decoding unit 514 are prepared one Video frame at a time in a video image buffer not particularly illustrated, and made visible. The AV synchronization adjusting unit 516 outputs, to the video monitor 517, the video image signals decoded for each Video frame in synchronization with the Vsync timing as represented by 702-1 of FIG. 7A(b).

In the meantime, each Audio PES input from the transmission line 519 of FIG. 5 to the PES multiplexing unit 513 is input as represented by FIG. 7B(c). Since there is no need to transmit a PCR that indicates the timing of the encoder STC in this embodiment, it is not necessary to demultiplex a TS packet (the broken line portion 512 of FIG. 5). In each Audio PES, an Audio ES having a stream length which is encoded into an audio signal and corresponds to a Video frame interval is stored. In this case, one Audio PES can include a plurality of Audio ESs generated at separate audio intervals. The PES multiplexing unit 510 demultiplexes Audio ESs from each Audio PES at audio intervals. For example, Audio ES1, Audio ES2, Audio ES3, Audio ES4, . . . are sequentially demultiplexed as represented by FIG. 7B(d). Moreover, a Dummy ES can be included at the beginning of the Audio PES at the capturing start timing of an audio signal. In this case, the PES multiplexing unit 510 outputs a difference value from the Vsync timing superposed on the encoding side to the capturing start timing of the audio signal on the basis of a stream length of the Dummy ES as represented by 701-2 of FIG. 7B(c). In FIG. 7B, the difference value is, for example, 10.

The Audio ESs at audio intervals, which are demultiplexed by the PES demultiplexing unit 513, are respectively decoded into audio signals by the Audio decoding unit 515 of FIG. 5, and sequentially output to an audio buffer not particularly illustrated. When the audio signals are prepared in the audio buffer and enabled to be output, the AV synchronization adjusting unit 516 of FIG. 5 starts to output the decoded audio signals at audio intervals to the audio speaker 518 by shifting a timing from the Vsync timing immediately after the audio signals are prepared by the difference value reported from the PES demultiplexing unit 513. In the example of FIG. 7B, the decoded audio signals at audio intervals start to be output at the timing shifted by the time=10 milliseconds, corresponding to the difference value from the Vsync timing represented by 702-2 of FIG. 7B(e).

As described above, in the configuration of the encoding/decoding system according to the embodiment illustrated in FIG. 5, the encoder (multiplexing unit) 203 of FIG. 2 and the TS multiplexing unit 211 within the encoder 203, and the decoder (demultiplexing unit) 204 of FIG. 2 and the TS demultiplexing unit 220 within the decoder 204 become unnecessary. Namely, the broken line portions of 503, 511, 504, and 512 of FIG. 5 become unnecessary. Moreover, the function of converting between a Video ES and a Video PES becomes unnecessary in the PES multiplexing unit 510 and the PES demultiplexing unit 513, which are illustrated in FIG. 5. As a result, for example, even though the size of a handled video image increases, the multiplexing buffers 219 and 220, which are needed in the portions of the TS multiplexing unit 211 and the TS demultiplexing unit 220 in FIG. 2 become unnecessary, whereby the size and the cost of the system can be prevented from being increased.

Figure 8:
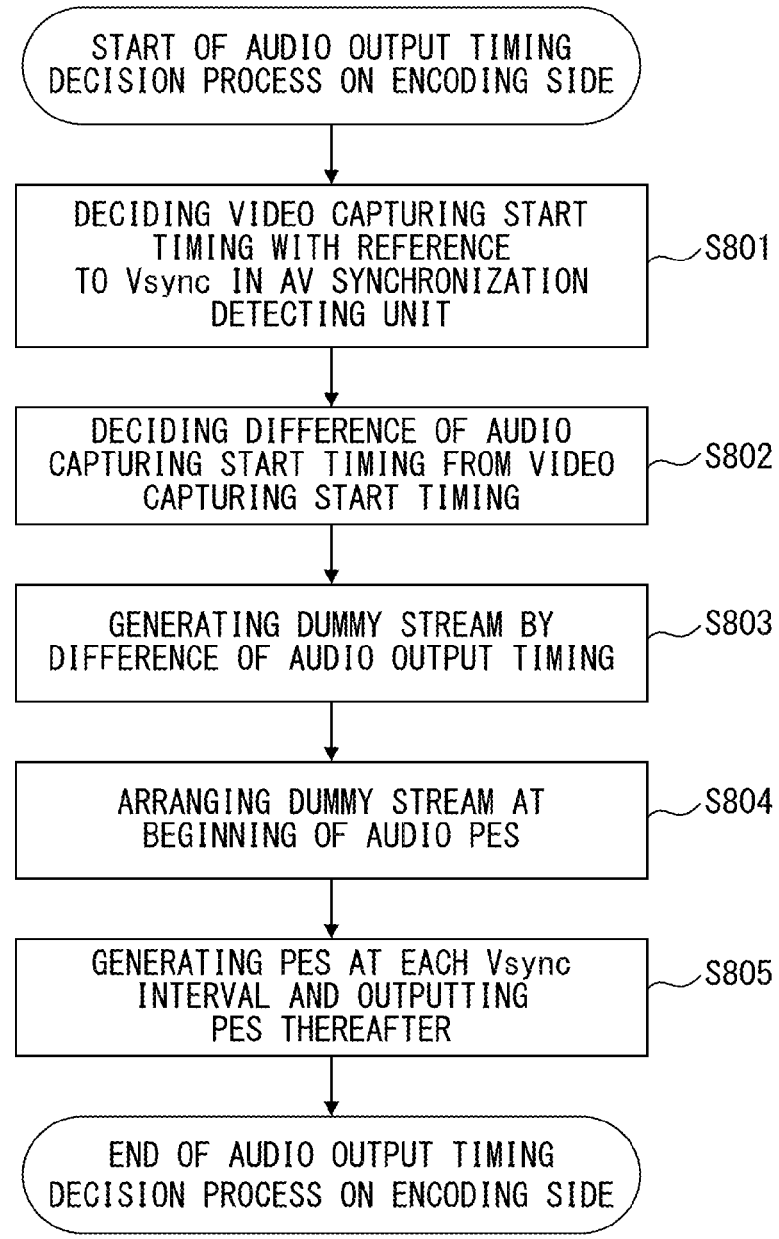
FIG. 8 is a flowchart illustrating a starting process of an audio output timing decision process on an encoding side in the embodiment.

FIG. 8 is a flowchart illustrating a start process, which is executed on the encoding side, of an audio output timing decision process in the embodiment having the system configuration illustrated in FIG. 5. This process is implemented as operations that a CPU (Central Processing Unit), not particularly illustrated, within a computer implementing the functions of the encoder (encoding unit) 501 illustrated in FIG. 5 performs to execute a control program stored in a memory not particularly illustrated.

Initially, the AV synchronization detecting unit 507 of FIG. 5 determines the capturing start timing of a video image signal (video capturing start timing) with reference to Vsync (step S801).

Next, the AV synchronization detecting unit 507 determines a difference value of the video capturing start timing from the capturing start timing of an audio signal (step S802).

Then, the PES multiplexing unit 510 of FIG. 5 generates a Dummy ES (dummy stream) having a stream length corresponding to the above described difference value (step S803).

Next, the PES multiplexing unit 510 arranges the generated Dummy ES at the beginning of the Audio PES (step S804) (see 701-2 of FIG. 7B).

Hereafter, the PES multiplexing unit 510 generates and outputs an Audio PES at each interval of Vsync (step S805).

FIG. 9 is a flowchart illustrating a start process, which is executed on the decoding side, of the audio output timing decision process in the embodiment having the system configuration illustrated in FIG. 5. This process is implemented as operations that a CPU, not particularly illustrated, within a computer implementing the functions of the decoder (decoding unit) 502 illustrated in FIG. 5 performs to execute a control program stored in a memory not particularly illustrated.

Initially, the AV synchronization adjusting unit 516 of FIG. 5 determines a display timing of a video image signal with reference to a Vsync signal on the side of the decoder (decoding unit) 502 (S901).

Next, the PES demultiplexing unit 513 of FIG. 5 obtains a difference value from the Vsync timing superposed on the encoding side to the capturing start timing of an audio signal on the basis of a stream length of a Dummy ES multiplexed with the Audio PES (step S902).

Next, the AV synchronization adjusting unit 516 of FIG. 5 determines an audio output timing on the basis of a video display timing synchronous with Vsync, and the difference value reported from the PES demultiplexing unit 513 (step S903) (see 702-2 of FIG. 7B).

Then, at and after the audio output timing, the AV synchronization adjusting unit 516 successively outputs audio signals at audio intervals, which are sequentially output from the Audio decoding unit 515 of FIG. 5 via an audio buffer not particularly illustrated (step S904).

Figure 10:
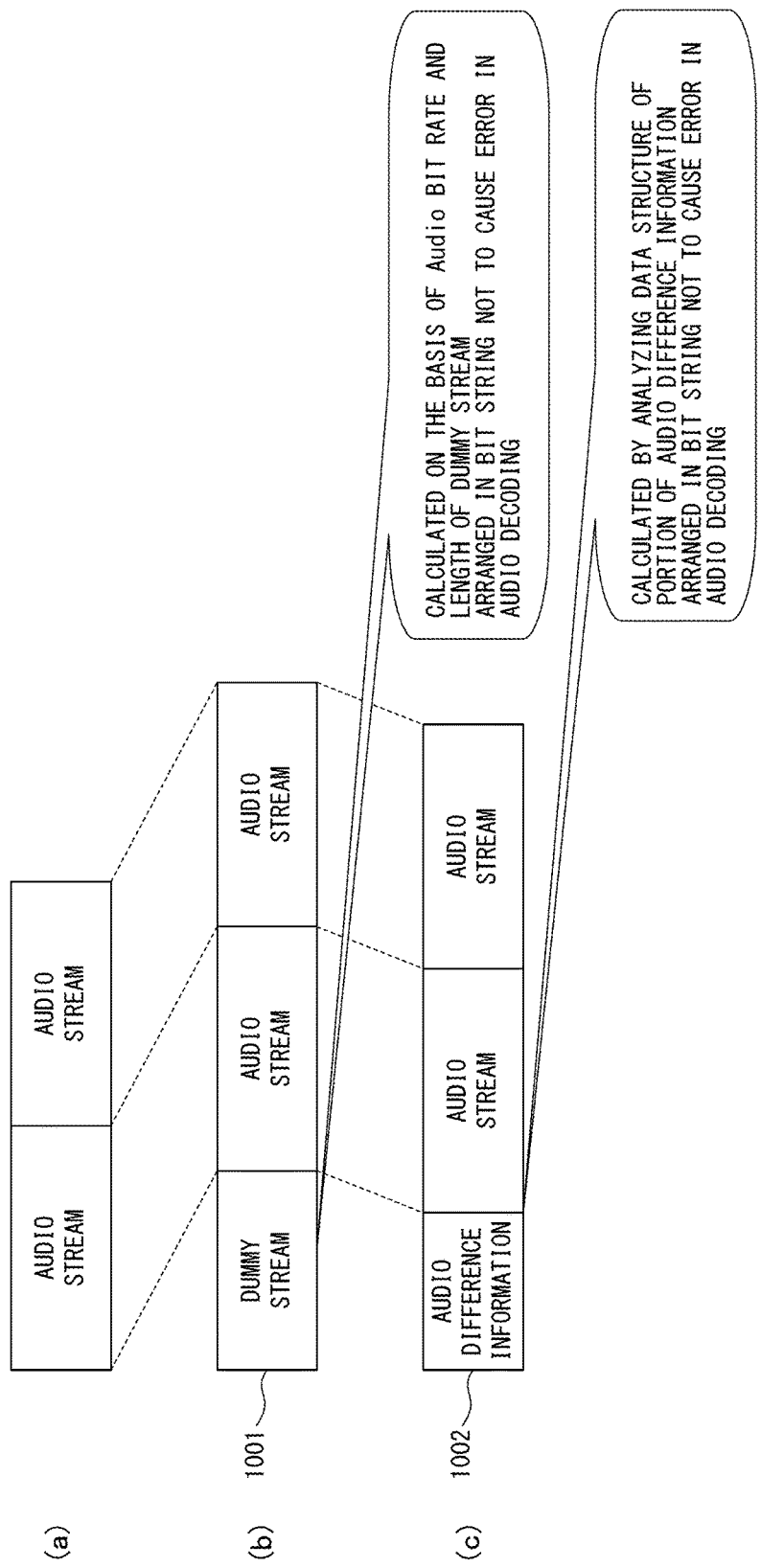
FIG. 10 is an explanatory diagram of another embodiment.

FIG. 10 is an explanatory diagram of another embodiment.

In the general configuration described with reference to FIGS. 1 to 4, audio streams (Audio ESs) are simply packetized in an Audio PES as represented by FIG. 10(a).

In the meantime, in the above described embodiment described with reference to FIGS. 5 to 9, the dummy stream 1001 is arranged at the beginning of an Audio PES at an audio capturing start timing, as represented by FIG. 10(b). Then, the dummy stream 1001 is set to have a stream length corresponding to a difference value from the Vsync timing to the audio capturing start timing. Subsequently, successive audio streams (Audio ESs) are arranged. In this case, a bit string of the dummy stream 1001 is considered not to cause an audio decoding error in the Audio decoding unit 515 of FIG. 5.

FIG. 10(c) illustrates another embodiment that reports audio capturing start timing. In this embodiment, audio difference information is stored at the beginning of an Audio PES at the audio capturing start timing. This audio difference information is information that indicates a difference value from the Vsync timing to the audio capturing start timing. This audio difference information is demultiplexed from an Audio PES by the PES demultiplexing unit 513 of FIG. 5, and reported to the AV synchronization adjusting unit 516 as a difference value. Also in this case, a bit string is considered not to cause an audio decoding error in the Audio decoding unit 515 of FIG. 5.

According to the above described embodiments, the number of modules for the signal processes can be reduced, and the system can be built with ease.

Additionally, with a decrease in the number of modules, preparation of the multiplexing and demultiplexing modules such as the TS multiplexing unit, the TS demultiplexing unit, and the like, and the operations for creating and combining an interface between blocks can be reduced.

Furthermore, by reducing the TS multiplexing unit, the TS demultiplexing unit and the like, the system can be downsized and configured to consume less power.

Figure 11:
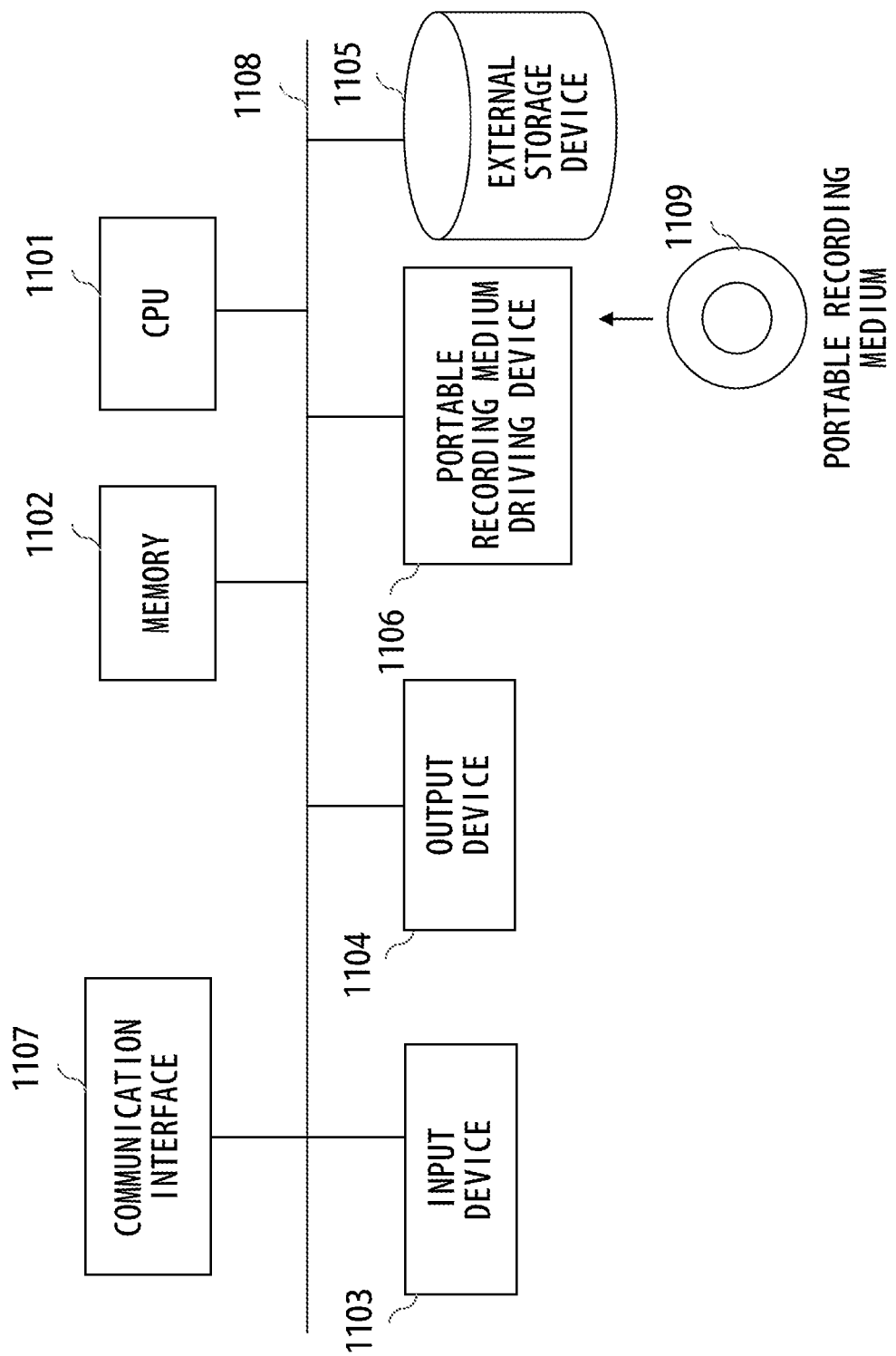
FIG. 11 illustrates a configuration of a hardware system capable of implementing the system according to the embodiment.

FIG. 11 illustrates an example of a hardware configuration of a computer that can implement the above described system as software processes.

The computer illustrated in FIG. 11 includes a CPU 1101, a memory 1102, an input device 1103, an output device 1104, an external storage device 1105, a portable recording medium driving device 1106 into which a portable recording medium 1109 is inserted, and a communication interface 1107. These components are interconnected by a bus 1108. The configuration illustrated in this figure is one example of the computer that can implement the above described system. Such a computer is not limited to this configuration.

The CPU 1101 (a processor) controls the entire computer. The memory 1102 is a memory such as a RAM or the like that temporarily stores a program or data stored in the external storage device 1105 (or on the portable recording medium 1109) when the program is executed or the data is updated. The CPU 1101 controls the entire computer by reading the program into the memory 1102 and executing the program.

The input device 1103 detects an input operation that a user performs with a keyboard, a mouse or the like. The output device 1104 notifies the CPU 1101 of a result of the detection, and outputs data transmitted according to the control of the CPU 1101 to a display device or a printing device.

The external storage device 1105 is, for example, a hard disk storage device. The external storage device 1105 is mainly used to store various types of data and programs.

The portable recording medium driving device 1106 accommodates the portable recording medium 1109 (A non-transitory computer-readable recording medium) such as an optical disk, an SDRAM, a compact flash or the like, and has a role in assisting the external storage device 1105.

The communication interface 1107 is a device for connecting a communication line such as a LAN (Local Area Network) or a WAN (Wide Area Network).

The system according to the embodiments is implemented in such a way that the CPU 1101 executes the program that describes the functions of the units illustrated in FIG. 5, or the functions of the control operations implemented by the operational flowcharts of FIGS. 8 and 9. The program may be distributed, for example, by being recorded in the external storage device 1105 or on the portable recording medium 1109. Alternatively, the program may be obtained from a network by the network connecting device 1107.

According to the embodiments, the need for transmitting a PTS is eliminated, so that the Video PES multiplexing unit and the Video PES demultiplexing unit become unnecessary, and at the same time, the need for transmitting a PCR is also eliminated, so that the TS multiplexing unit and the TS demultiplexing unit become unnecessary. Accordingly, the number of modules for the entire system can be reduced, whereby the system can be downsized, built with ease, and configured to consume less power.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a depicting of the superiority and inferiority of the invention. Although the embodiments of the present invention have been described in detail, it should be understood that the various changes, substitutions, and alterations could be made hereto without departing from the spirit and scope of the invention.

What is claimed is:

1. An elementary stream multiplexing method for compressing and encoding a video image signal and an audio signal and for delivering the video image signal and the audio signal in a stream format, the method comprising:
    generating and outputting a video elementary stream by capturing and encoding the video image signal at a time interval of a video frame synchronous with a timing of a video synchronization signal at the time of an encoding process;
    generating an audio elementary stream by capturing and encoding the audio signal at each audio interval at the time of the encoding process;
    multiplexing with the audio elementary stream an audio packetized elementary stream where one packet has a stream length corresponding to the time interval of the video frame, and outputting the stream at the time of the encoding process;
    decoding the video image signal from the video elementary stream at the time of a decoding process;
    demultiplexing the audio elementary stream at the audio interval from the audio packetized elementary stream at the time of the decoding process;
    decoding the audio signal from the audio elementary stream at the time of the decoding process;
    outputting the decoded video image signal and the decoded audio signal in synchronization with the video synchronization signal at the time of the decoding process;
    outputting, at each capturing start timing of the audio signal, a difference value of the timing from the timing of the video synchronization signal at the time of the encoding process;
    generating a dummy audio elementary stream having a stream length corresponding to the difference value and multiplexing the audio packetized elementary stream with the generated dummy audio elementary stream when the difference value is output, at the time of the encoding process;
    outputting the difference value on the basis of a stream length of the dummy audio elementary stream when the audio packetized elementary stream is multiplexed with the dummy audio elementary stream at the time of the decoding process; and
    outputting the audio signal, which is obtained by decoding the audio elementary stream demultiplexed subsequently to the dummy audio elementary stream, at a timing shifted from the timing of the video synchronization signal by the difference value when the difference value is output, at the time of the decoding process.

2. An elementary stream encoding method for compressing and encoding a video image signal and an audio signal in a stream format, the method comprising:
    generating and outputting a video elementary stream by capturing and encoding the video image signal at a time interval of a video frame synchronous with a timing of a video synchronization signal;
    generating an audio elementary stream by capturing the audio signal and encoding the audio signal at each audio interval;
    multiplexing with the audio elementary stream an audio packetized elementary stream where one frame has a stream length corresponding to a time interval of the video frame, and outputting the stream;
    outputting, at each capturing start timing of the audio signal, a difference value of the timing from the timing of the video synchronization signal; and
    generating a dummy audio elementary stream having a stream length corresponding to the difference value and multiplexing the audio packetized elementary stream with the generated dummy audio elementary stream, when the difference value is output.

3. An elementary stream decoding method for decoding a video image signal and an audio signal, which are encoded in a stream format, the method comprising:
    decoding the video image signal from a video elementary stream;
    demultiplexing an audio elementary stream at each audio interval from an audio packetized elementary stream;
    decoding the audio signal from the audio elementary stream; and
    outputting the decoded video image signal and the decoded audio signal in synchronization with a timing of a video synchronization signal;
    outputting a difference value on the basis of a stream length of a dummy audio elementary stream when the audio packetized elementary stream is multiplexed with the dummy audio elementary stream; and outputting the audio signal, which is obtained by decoding the audio elementary stream demultiplexed subsequently to the dummy audio elementary stream, at a timing shifted from the timing of the video synchronization signal by the difference value, when the difference value is output.

4. An elementary stream multiplexing system that compresses and encodes a video image signal and an audio signal, and passes the video image signal and the audio signal in a stream format, the system comprising a processor, wherein the processor generates and outputs a video elementary stream by capturing and encoding the video image signal at a time interval of a video frame synchronous with a timing of a video synchronization signal, generates an audio elementary stream by capturing and encoding the audio signal at each audio interval, multiplexes with the audio elementary stream an audio packetized elementary stream where one packet has a stream length corresponding to the time interval of the video frame and outputs the stream, decodes the video image signal from the video elementary stream, demultiplexes the audio elementary stream at the audio interval from the audio packetized elementary stream, decodes the audio signal from the audio elementary stream, outputs the decoded video image signal and the decoded audio signal in synchronization with the video synchronization signal, outputs, at each capturing start timing of the audio signal, a difference value of the timing from the timing of the video synchronization signal, generates a dummy audio elementary stream having a stream length corresponding to the difference value and multiplexes the audio packetized elementary stream with the generated dummy audio elementary stream when the difference value is output, outputs the difference value on the basis of a stream length of the dummy audio elementary stream when the audio packetized elementary stream is multiplexed with the dummy audio elementary stream, and outputs the audio signal, which is obtained by decoding the audio elementary stream demultiplexed subsequently to the dummy audio elementary stream, at a timing shifted from the timing of the video synchronization signal by the difference value, when the difference value is output.

5. An elementary stream encoding apparatus for compressing and encoding a video image signal and an audio signal in a stream format, the apparatus comprising a processor, wherein the processor generates and outputs a video elementary stream by capturing and encoding the video image signal at a time interval of a video frame synchronous with a timing of a video synchronization signal, generates an audio elementary stream by capturing the audio signal and encoding the audio signal at each audio interval, multiplexes with the audio elementary stream an audio packetized elementary stream where one packet has a stream length corresponding to the time interval of the video frame and outputs the stream, outputs, at each capturing start timing of the audio signal, a difference value of the timing from the timing of the video synchronization signal, generates a dummy audio elementary stream having a stream length corresponding to the difference value, and multiplexes the audio packetized elementary stream with the generated dummy audio elementary stream when the difference value is output.

6. An elementary stream decoding apparatus for decoding a video image signal and an audio signal, which are encoded in a stream format, the apparatus comprising a processor, wherein the processor decodes the video image signal from a video elementary stream, demultiplexes an audio elementary stream at each audio interval from an audio packetized elementary stream, decodes the audio signal from the audio elementary stream, outputs the decoded video image signal and the decoded audio signal in synchronization with a timing of a video synchronization signal, outputs a difference value on the basis of a stream length of a dummy audio elementary stream when the audio packetized elementary stream is multiplexed with the dummy audio elementary stream, and outputs the audio signal, which is obtained by decoding the audio elementary stream demultiplexed subsequently to the dummy audio elementary stream, at a timing shifted from the timing of the video synchronization signal by the difference value when the difference value is output.

7. A non-transitory computer-readable recording medium having stored therein a program for causing a computer to execute a process for compressing and encoding a video image signal and an audio signal and for delivering the video image signal and the audio signal in a stream format, the process comprising:

generating and outputting a video elementary stream by capturing and encoding the video image signal at a time interval of a video frame synchronous with a timing of a video synchronization signal at the time of an encoding process;

generating an audio elementary stream by capturing the audio signal and encoding the audio signal at each audio interval at the time of the encoding process;

multiplexing with the audio elementary stream an audio packetized elementary stream where one packet has a stream length corresponding to the time interval of the video frame at the time of the encoding process;

decoding the video image signal from the video elementary stream at the time of a decoding process;

demultiplexing the audio elementary stream at the audio interval from the audio packetized elementary stream at the time of the decoding process;

decoding the audio signal from the audio elementary stream at the time of the decoding process;

outputting the decoded video image signal and the decoded audio signal in synchronization with the video synchronization signal at the time of the decoding process;

outputting, at each capturing start timing of the audio signal, a difference value of the timing from the timing of the video synchronization signal at the time of the encoding process;

generating a dummy audio elementary stream having a stream length corresponding to the difference value and multiplexing the audio packetized elementary stream with the generated dummy audio elementary stream when the difference value is output, at the time of the encoding process;

outputting the difference value on the basis of a stream length of the dummy audio elementary stream when the audio packetized elementary stream is multiplexed with the dummy audio elementary stream at the time of the decoding process; and outputting the audio signal, which is obtained by decoding the audio elementary stream demultiplexed subsequently to the dummy audio elementary stream, at timing shifted from the timing of the video synchronization signal by the difference value when the difference value is output, at the time of the decoding process.

8. A non-transitory computer-readable recording medium having stored therein a program for causing a computer to execute a process for compressing and encoding a video image signal and an audio signal in a stream format, the process comprising:

generating and outputting a video elementary stream by capturing and encoding the video image signal at a time interval of a video frame synchronous with a timing of a video synchronization signal;

generating an audio elementary stream by capturing the audio signal and encoding the audio signal at each audio interval;

multiplexing with the audio elementary stream an audio packetized elementary stream where one packet has a stream length corresponding to the time interval of the video frame, and outputting the stream;

outputting, at each capturing start timing of the audio signal, a difference value of the timing from the timing of the video synchronization signal; and generating a dummy audio elementary stream having a stream length corresponding to the difference value and multiplexing the audio packetized elementary stream with the generated dummy audio elementary stream, when the difference value is output.

9. A non-transitory computer-readable recording medium having stored therein a program for causing a computer to execute a process for decoding a video image signal and an audio signal, which are encoded in a stream format, the process comprising:

decoding the video image signal from a video elementary stream;

demultiplexing an audio elementary stream at each audio interval from an audio packetized elementary stream;

decoding the audio signal from the audio elementary stream;

outputting the decoded video image signal and the decoded audio signal in synchronization with a timing of a video synchronization signal;

outputting a difference value on the basis of a stream length of a dummy audio elementary stream when the audio packetized elementary stream is multiplexed with the dummy audio elementary stream; and outputting the audio signal, which is obtained by decoding the audio elementary stream demultiplexed subsequently to the dummy audio elementary stream, at timing shifted from the timing of the video synchronization signal by the difference value, when the difference value is output.

\* \* \* \* \*